Aug. 12, 1924.  
G. W. DORMAN  
1,505,005  
POWER SETWORKS FOR SAWMILL CARRIAGES  
Filed June 10, 1918  
10 Sheets-Sheet 1

*Fig. 1.*

WITNESSES  
Howard D. Orr.  
H. T. Chapman

George W. Dorman, INVENTOR,  
BY E. G. Siggers.  
ATTORNEY

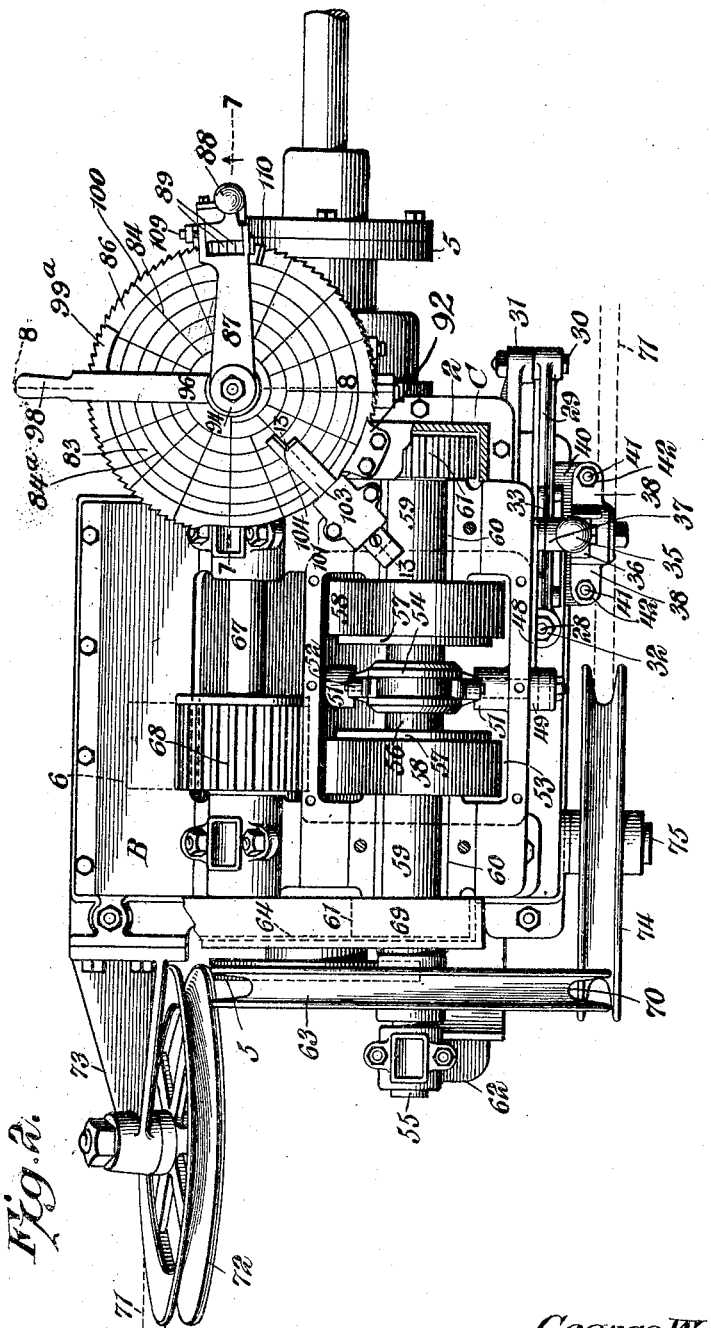

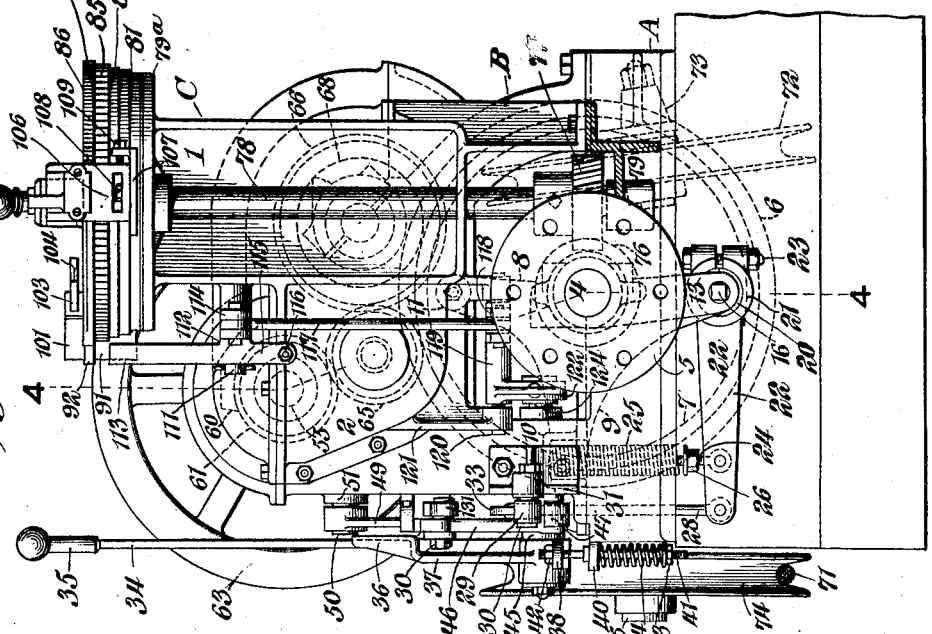

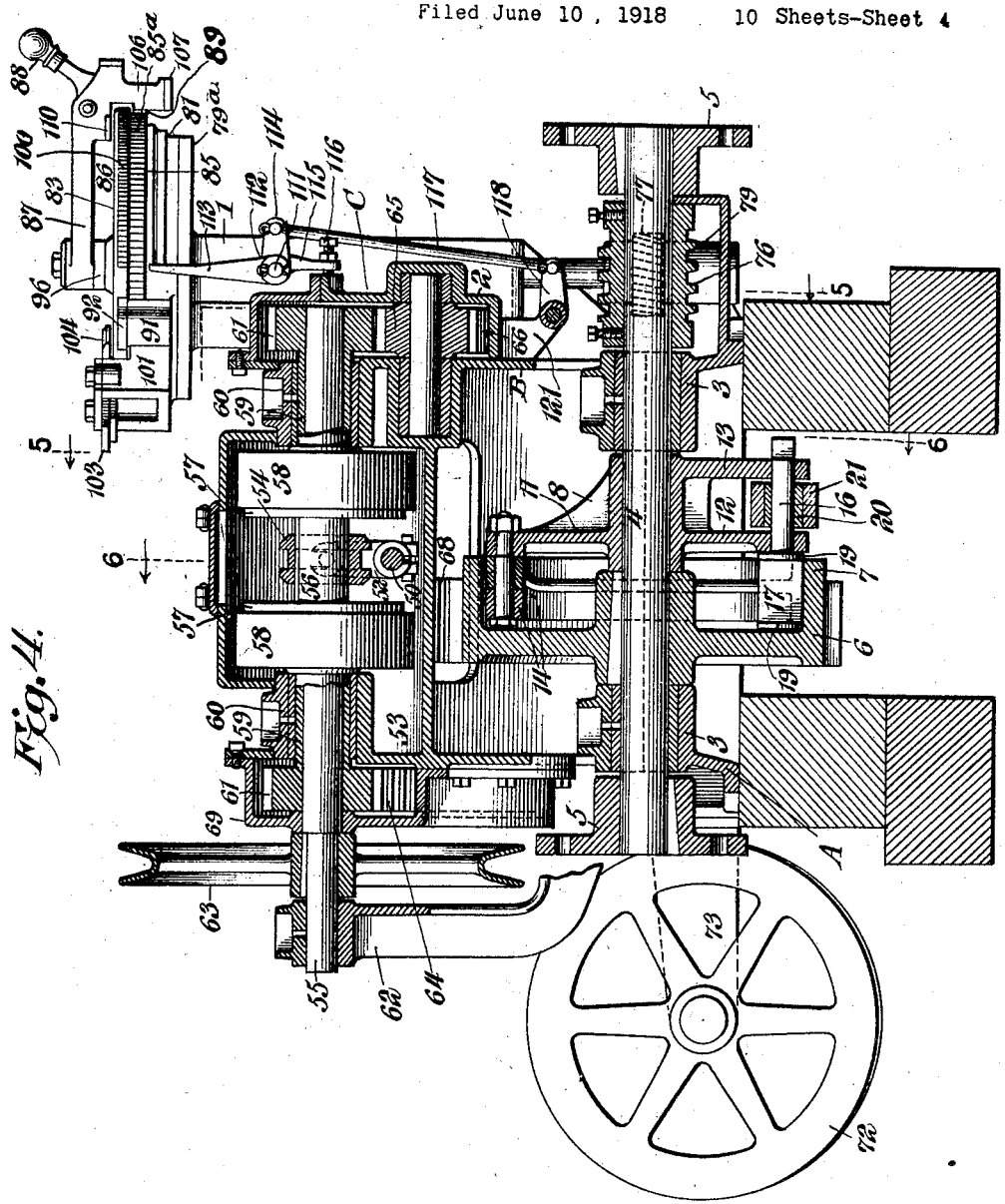

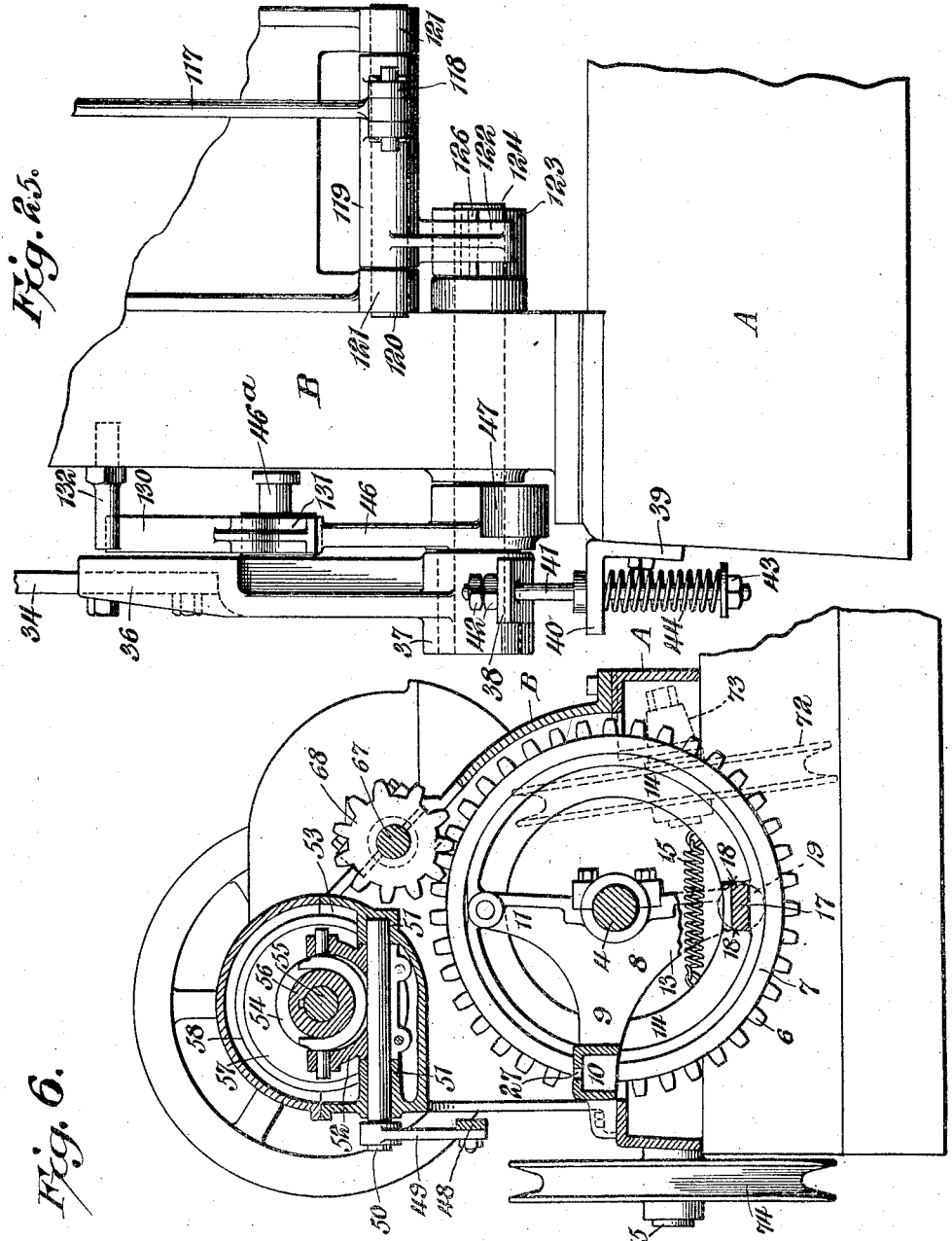

Aug. 12, 1924.
G. W. DORMAN
1,505,005
POWER SETWORKS FOR SAWMILL CARRIAGES
Filed June 10, 1918    10 Sheets-Sheet 6
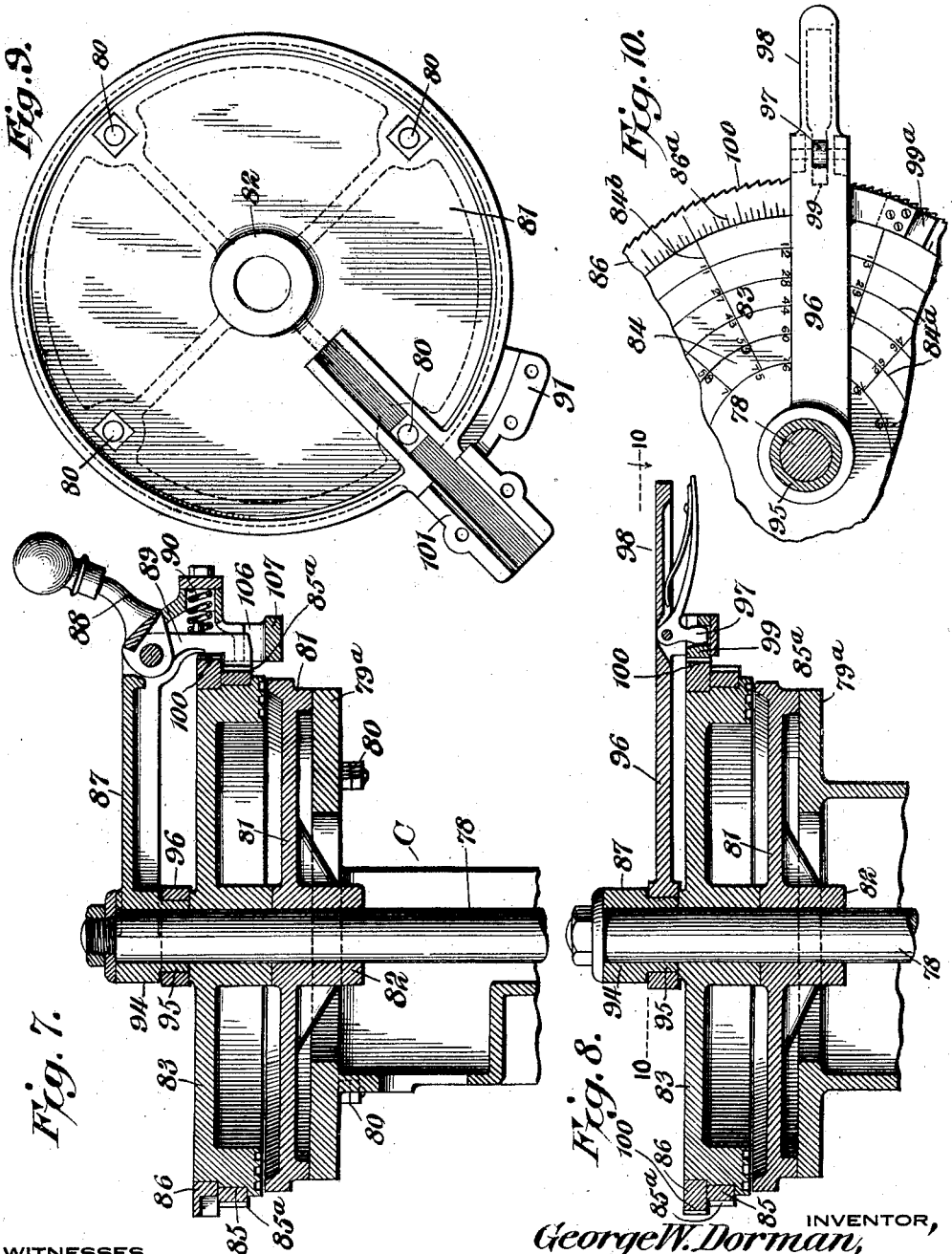
WITNESSES
INVENTOR,
George W. Dorman,
BY
ATTORNEY Aug. 12, 1924.  
G. W. DORMAN  
1,505,005  
POWER SETWORKS FOR SAWMILL CARRIAGES  
Filed June 10, 1918   10 Sheets-Sheet 7
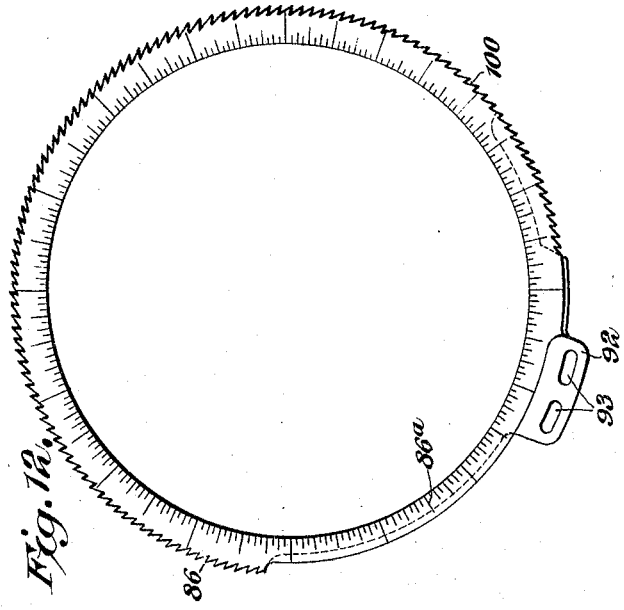
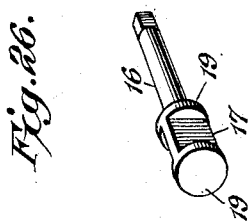
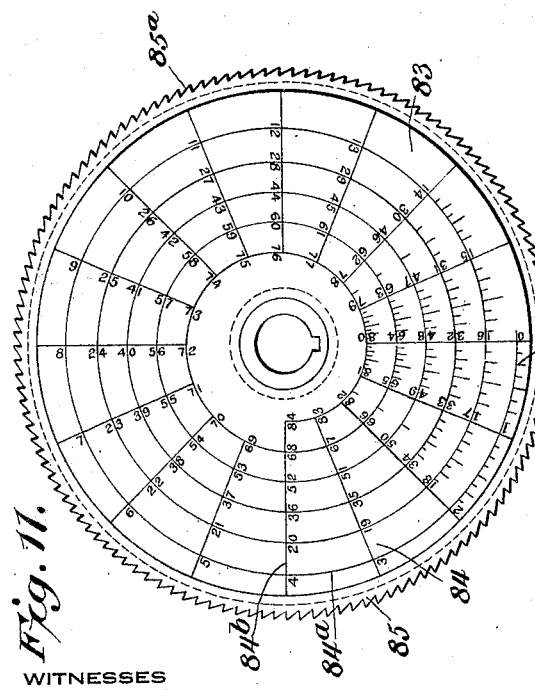
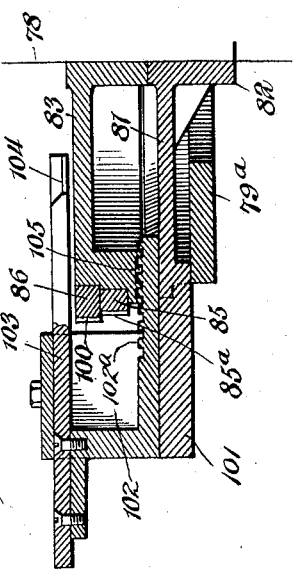
WITNESSES  
Howard D. Orr.  
H. T. Chapman
INVENTOR,  
George W. Dorman,  
BY E. G. Siggers.  
ATTORNEY

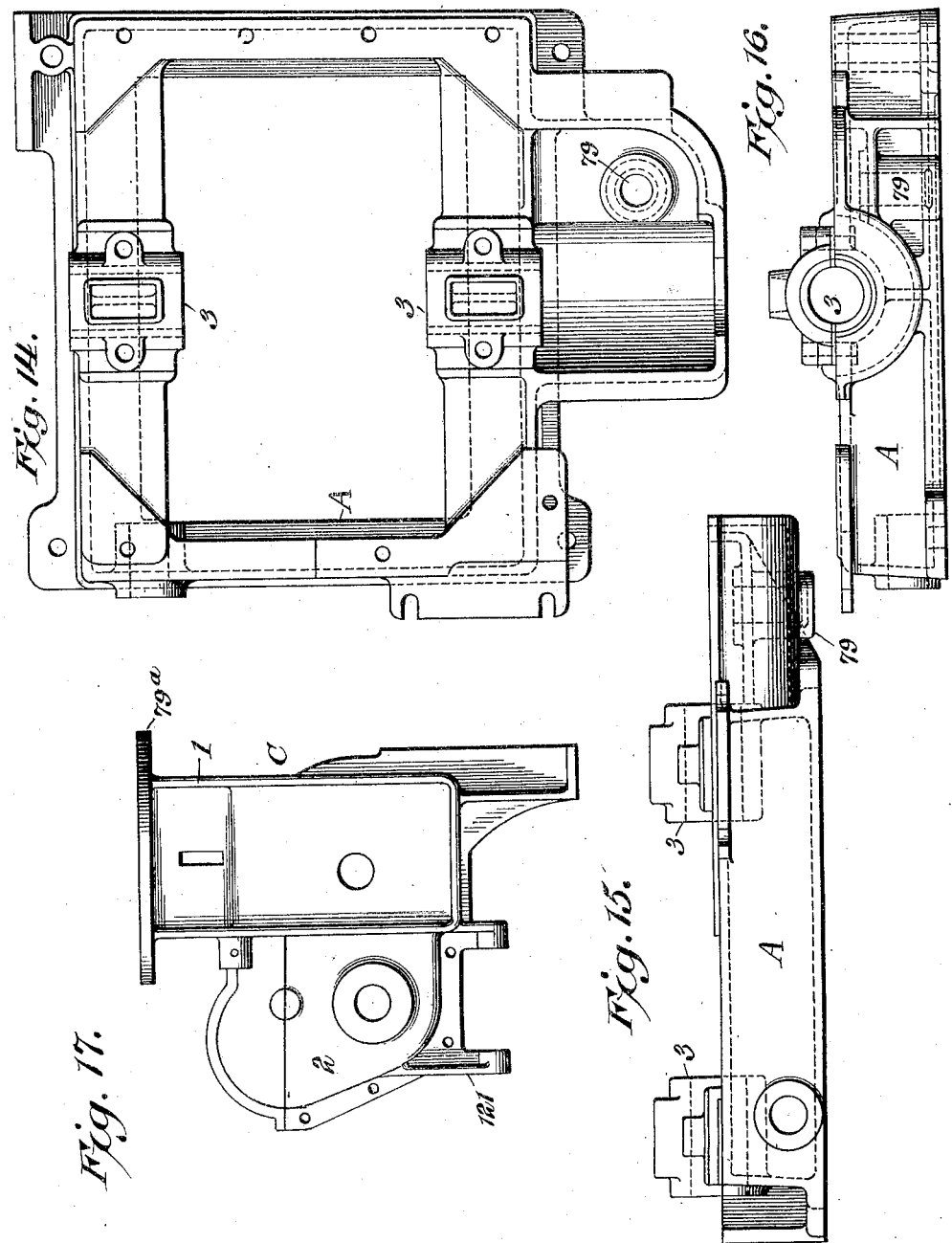
Aug. 12, 1924.  G. W. DORMAN  1,505,005
POWER SETWORKS FOR SAWMILL CARRIAGES
Filed June 10, 1918  10 Sheets-Sheet 8

Aug. 12, 1924.                                              1,505,005
G. W. DORMAN
POWER SETWORKS FOR SAWMILL CARRIAGES
Filed June 10, 1918    10 Sheets-Sheet 9
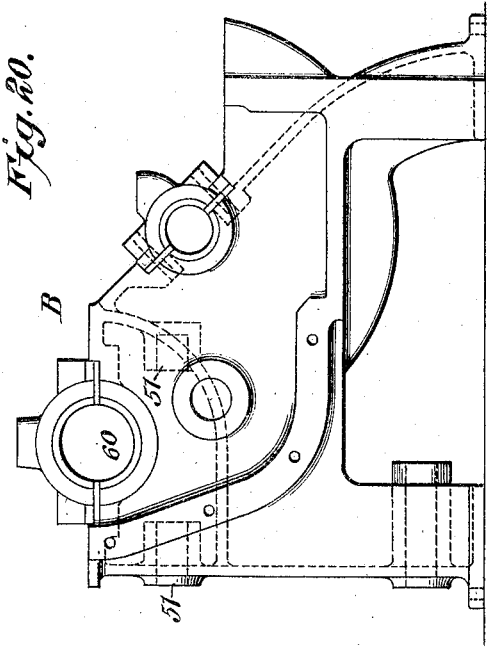
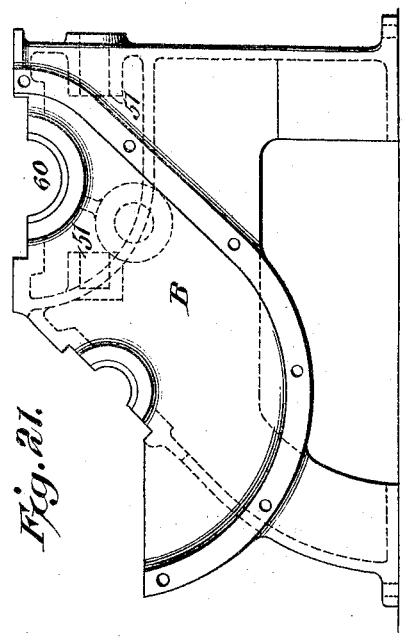
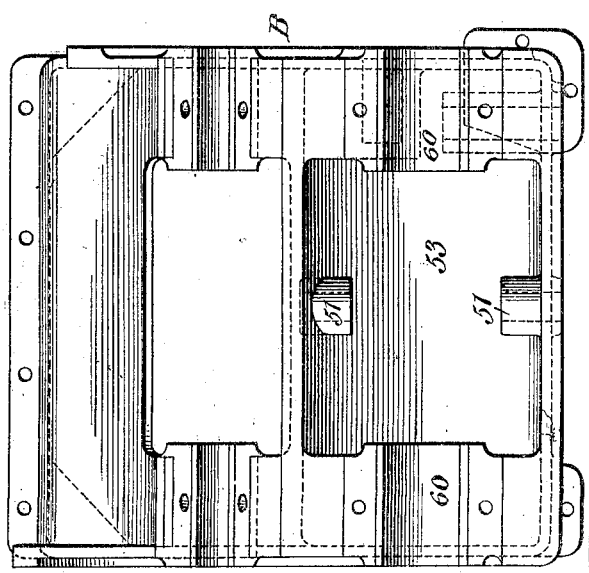
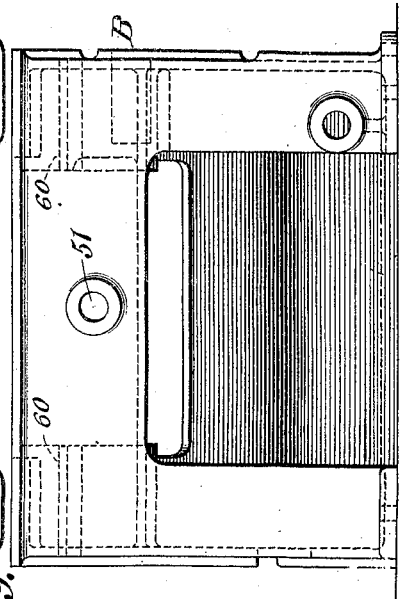
WITNESSES
Howard D. Orr
F. T. Chapman
INVENTOR,
George W. Dorman,
BY E. G. Siggers
ATTORNEY

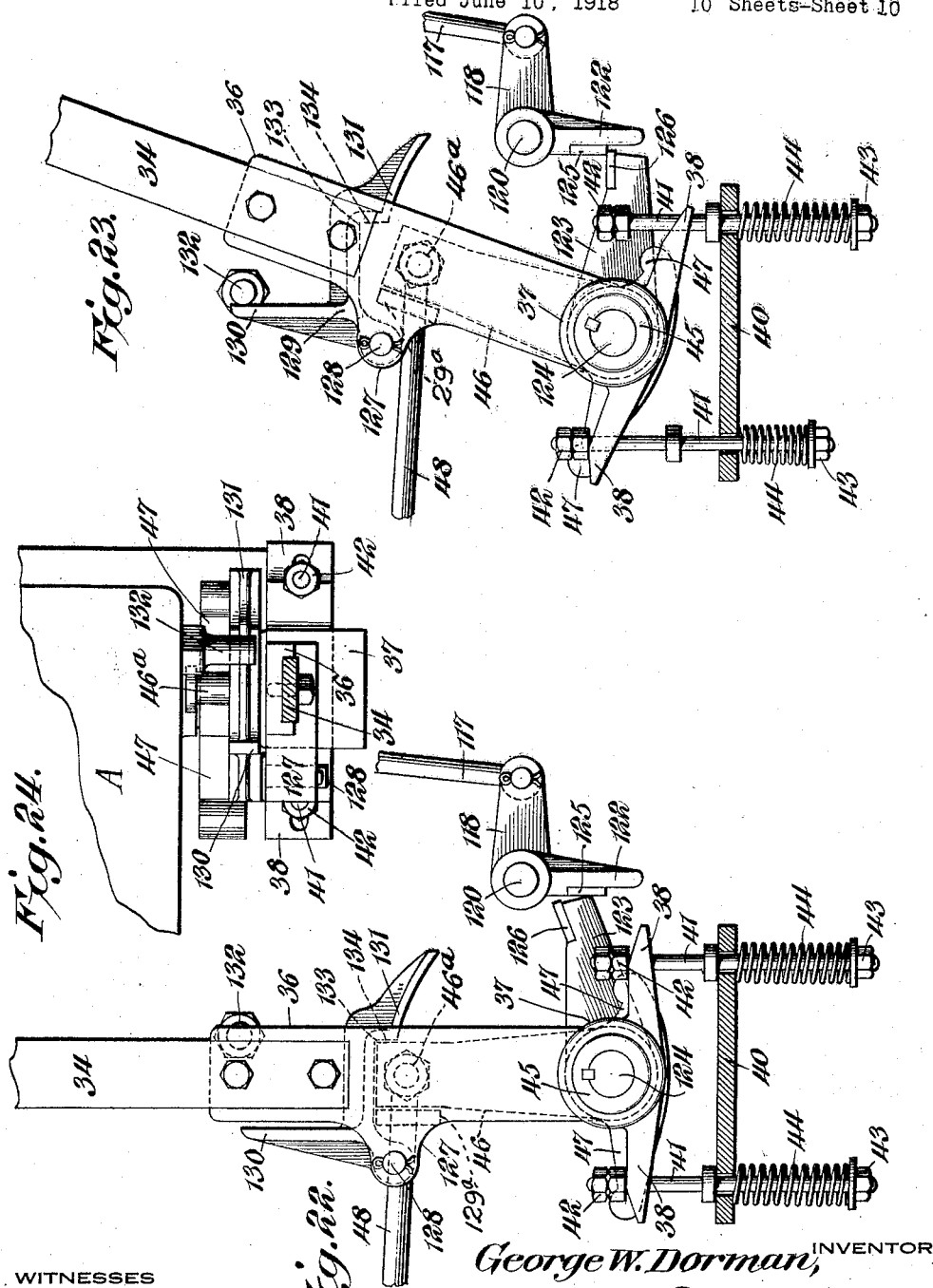

Patented Aug. 12, 1924.

1,505,005

UNITED STATES PATENT OFFICE.

GEORGE WASHINGTON DORMAN, OF EVERETT, WASHINGTON, ASSIGNOR TO SUMNER IRON WORKS, OF EVERETT, WASHINGTON, A CORPORATION OF WASHINGTON.

POWER SETWORKS FOR SAWMILL CARRIAGES.

Application filed June 10, 1918. Serial No. 239,158.

*To all whom it may concern:*

Be it known that I, GEORGE W. DORMAN, a citizen of the United States, residing at Everett, in the county of Snohomish and State of Washington, have invented a new and useful Power Setworks for Sawmill Carriages, of which the following is a specification.

This invention has reference to power set works for saw mill carriages, and its objects are to provide means for permitting all high speed members to be enclosed and run in a lubricant, to relieve the operator from the necessity of any attention after setting the index to the thickness of the timber or lumber to be cut, to provide means whereby fine adjustments are made possible and to further simplify and improve the power set works.

The invention will be best understood from a consideration of the following detailed description, taken in connection with the accompanying drawings forming part of this specification, with the further understanding that, while the drawings show a practical form of the invention, the latter is not confined to any strict conformity with the showing of the drawings but may be changed and modified so long as such changes and modifications come within the scope of the appended claims.

In the drawings:

Figure 1 is a side elevation of a machine embodying the invention;

Fig. 2 is a plan view thereof;

Fig. 3 is an elevation of the right hand end of the machine as seen in Figure 1;

Fig. 4 is a section on the line 4—4 of Fig. 3;

Fig. 5 is a section on the line 5—5 of Fig. 4, omitting certain parts;

Fig. 6 is a section on the line 6—6 of Fig. 4;

Fig. 7 is a section on the line 7—7 of Fig. 2, but omitting distant parts;

Fig. 8 is a section on the line 8—8 of Fig. 2, but omitting distant parts;

Fig. 9 is a plan view of the base plate for the index head;

Fig. 10 is a section on the line 10—10 of Fig. 8;

Fig. 11 is a plan view of the log index and ratchet ring therefor;

Fig. 12 is a plan view of the board index ring;

Fig. 13 is a section on the line 13—13 of Fig. 2;

Figs. 14 to 21 inclusive are plans and elevations of the frame members of the machine;

Fig. 22 is an elevation with some parts in section and some parts broken away of the control and master levers in the neutral position;

Fig. 23 is a similar view of the same parts in the actuated position;

Fig. 24 is a plan view of a portion of the structure shown in Fig. 22;

Fig. 25 is an elevation of the structure shown in Fig. 22, as viewed from the right hand side of Fig. 22 and showing corresponding portions of the frame of the machine supporting the structures shown in Fig. 22.

Fig. 26 is a perspective view of a member of the brake operating mechanism.

Referring first to Figs. 14 to 21 of the drawings, which illustrate the frame members of the machine separate from other mechanisms, there is shown a base plate A, illustrated particularly in Figs. 14 to 16, and a frame member B shown particularly in Figs. 18 to 21.

In the assembled machine the frame member B is superposed on the base member A, and is bolted or otherwise secured thereto, and these frame members not only support the mechanisms of the power set works, but house a considerable portion thereof.

There is also shown a casting C appearing separately in Fig. 17 and this casting is, in the assembled machine, connected to the frame members A and B and rises therefrom to provide a column 1 carrying the index mechanism, and forming a part of the casting C is a cap 2 for covering certain gearing to be described.

The castings A, B and C forming the frame of the machine may be of customary web and flange construction without, however, limitation to such particular construction.

The base A is provided with alined journal bearings 3 in which is mounted a shaft 4, best shown in Fig. 4, but also shown in Figs. 1, 3 and 6. At the ends of the shaft 4 are flange couplings 5 keyed or otherwise secured to the shaft and provided for interposition in and lining of the shaft 4 with the usual shaft (not shown) which runs lengthwise of the saw mill carriage for driving the actuating mechanism moving the saw carriage knees. No attempt is made to illustrate the saw mill carriage itself or the carriage knees, for these structures may follow the usual practice and do not in themselves enter into the invention.

Fast to the shaft 4 between its journal bearings 3 is a gear wheel 6, best shown in Figs. 1, 4 and 6. This gear wheel is provided with an overhanging flange 7 constituting one member of a friction brake. Mounted on the shaft 4, closely adjacent to the gear wheel 6, is a bracket 8 formed with a holding arm 9 extending from one side of the bracket and made fast to a fixed part of the frame A, and near the point of connection of the arm 9 with the frame A, said arm is provided with a socket portion 10 for a purpose to be described.

The bracket 8 extends to opposite sides of the shaft 4, as best shown in Fig. 6, and the shaft is arranged to turn in the bracket. On one side of the shaft 4, this being the upper side as shown in Fig. 6, the bracket 8 is provided with a single arm 11, while the other or lower side of the bracket is formed with two spaced arms 12 and 13 respectively, best shown in Fig. 4. The arms 11 and 12 are in substantially the same circumferential plane, while the arm 13 is spaced from such plane on that side of the arm 12 remote from the gear wheel 6.

Pivotally mounted on the arm 11 are friction brake shoes 14 housed within the gear wheel 6, so that they may be made to engage the inner face of the flange 7 to serve as a brake for arresting movements of the gear wheel 6. The brake shoes 14 are connected, at a point remote from their pivot support, by a spring 15 so as to have a normal tendency to move out of contact with the flange 7. The arms 12 and 13 have a short shaft 16 extending through and journaled in them and flattened at one end 17, as shown in Figs. 4, 6 and 26. The flattened end 17 of the shaft 16 enters between corresponding ends 18 of the brake shoes 14, these shoes being held against displacement in a direction lengthwise of the shaft 4 by spaced flanges 19 on the shaft 16. The shaft 16 between the arms 12 and 13 is surrounded by a split collar 20 keyed or otherwise made fast to the shaft and this collar is enclosed in a split head 21 on an arm 22, as best shown in Figs. 3 and 4. The head 21 is provided with a clamp bolt 23 for tightly securing it to the collar 20 and therefore to the shaft 16, whereby rocking movements of the arm 22 about the axis of the shaft 16 cause corresponding rocking movements of said shaft. Fast to the arm 22 at a point remote from the head 21 is a rod 24, Figure 3, pivotally connected to it and extending through the socket 10 to a point above the latter, the rod being upright in the installed position. Surrounding the rod 24 is a spring 25, and a set nut 26 is applied to the rod 24 to produce any desired degree of compression of the spring 25 between the nut 26 and the wall of the socket 10 with which the spring engages. The rod 24 extends through a hole 27 in the socket 10, so that the rod is suitably guided when moving with the arm 22 on rocking movements of the latter.

Pivoted to the outer end of arm 22 is one end of a link 28, Figures 1, 2 and 3, having its other end extending through the free end of a rock arm 29, which rock arm at the other end is pivoted upon a stud 30 carried by a bracket 31 fast to one side of the frame member B. The rod 28 is suitably threaded and provided with a nut 32 at the end extending through the arm 29 and adjacent to the free end the arm 29 is bowed as shown at 33, Figs. 1 and 3, so that it may clear certain parts to be described.

There is provided a set lever 34 shown in connection with the assembled machine in Figs. 1, 2 and 3, and seen more clearly in Figs. 22 to 25. This lever has a handle 35 at one end so that it may be manipulated at will, and at the other end the manipulating portion of the lever fits in and is bolted to a socket 36 constituting part of a casting having at the end remote from the socket a hub 37 on which there are produced oppositely extending ears 38.

A bracket 39, best shown in Figs. 1 and 25, is made fast by bolts or otherwise to the casting A and is formed with a shelf 40 traversed by rods 41 each also extending through a respective ear 38. The rods 41 have nuts 42 and 43 at opposite ends and between each nut 43 and the shelf 40 each rod is surrounded by a spring 44. The arrangement is such that the springs 44 act as equalizing springs, centralizing the lever 34 in an upright position, from which position the lever may be rocked in either direction in opposition to a corresponding one of the springs 44, and, when released, will return to the central or neutral position.

The hub 37 is mounted to rock on a hub 45 formed with an arm 46 (Fig. 25) and provided with oppositely directed crank arms 47 suitably positioned to underride the arm 29 on opposite sides of the bowed portion 33, said arm being shown in Figs. 1, 2 and 3 but omitted from Figs. 22 to 25. The hub 45 with the arms 46 and 47 constitutes a master lever, and when this lever is rocked, the arm 29 is raised, rocking on its pivot 30, thus in turn rocking the arm 22 and thereby setting the brakes 14.

The arm 46 of the master lever carries a stud 46ª near its upper end and to this stud is pivoted one end of a link 48, best shown in Fig. 1, which link at the other end is pivoted to a rock arm 49 carried by a shaft 50 shown in Figs. 1, 2, 3 and 6, and which shaft has journaled bearings 51 in the frame member B. The shaft 50 carries a fork 52, Figs. 1, 2 and 6, within a chamber 53, Figs. 4 and 6, formed in the frame member B. The fork 52 engages a circumferentially grooved ring 54 keyed or otherwise secured to a shaft 55 traversing the chamber 53 at right angles to the shaft 50 and constituting the driving shaft for the set works. The ring 54 is provided or formed with a hub 56, Figs. 4 and 6, carrying friction clutch members 57 at opposite ends. The shaft 55 within the chamber 53 carries other friction clutch members 58 loose thereon and each provided with a hub 59 through which the shaft 55 extends. Each hub member 59 has a journal bearing 60, Fig. 4, in a corresponding wall of the frame member B, and outside of the frame member has fast to it a pinion 61. At one end the shaft 55 is supported in a journal bracket 62 and between this bracket and the pinion 61 the shaft has a sheave 63 fixed thereto. One of the pinions 61 engages a gear wheel 64 on one side of the frame member B, and the pinion 61 on the other side of the frame member B engages an idle pinion 65 which, in turn, meshes with another gear wheel 66 similar to the gear wheel 64. The arrangement is such that when one clutch member 58 is coupled to the shaft 55, one of the gear wheels, say, the gear wheel 64, will rotate in one direction and when the other clutch member 58 is coupled to the shaft 55, in which case the first clutch member is uncoupled from the shaft, then the other gear wheel 66 is rotated, but in the opposite direction to gear wheel 64.

The two gear wheels 64 and 66 are mounted on a shaft 67, Figs. 2, 5 and 6, parallel to the shaft 55, and this shaft 67 carries a pinion 68, Figs. 2 and 6, meshing with the gear wheel 6, the arrangement being such that, with the shaft 55 rotating at a relatively high speed, the gear wheel 6 and shaft 4 carrying it rotate slowly.

The gear wheels 61 and 64 on one side of the casing are covered by a cap 69, and the gear wheels 61, 65 and 66 on the other side of the casing are covered by the cap or casing 2. In this way, relatively high speed gear wheels may be made to run in grease, thus insuring the thorough lubrication of these wheels.

The sheave 63 is designed to be rope or cable driven, and for this reason, is peripherally grooved as shown at 70, (Fig. 2) to grip the rope or cable.

When the mechanism is mounted on the saw carriage, the shaft 55 has its axis of rotation in the direction of travel of the carriage, and hence the sheave 63 is crosswise of such direction of travel. There is also provided an actuating rope or cable 71, Fig. 1, carried about a direction changing or lead sheave 72 mounted on the bracket 73 fast to the frame A, so that the rope 71, which extends lengthwise of the direction of travel of the saw carriage, is carried about the sheave 63 from whence it passes to another direction changing or lead sheave 74 having a journal support 75 on the base A, but on the opposite side thereof from the sheave 72. Because of this arrangement, the travel of the saw carriage imparts a comparatively rapid rotative movement to the sheave 63, which, in turn, imparts a relatively slow rotative movement, in one direction or the other through the intermediate gearing, to the shaft 4, which latter is connected by the couplings 5 to the usual shaft for adjusting the saw carriage knees.

Mounted on the shaft 4 is a worm 76 meshing with a worm wheel 77 on the lower portion of an upright shaft 78 mounted at the lower end in a bearing 79 fast to the base A, Figs. 1, 3, 14, 15 and 16. The shaft 78 rises through the column 1, which latter is made fast to the base member A and also to the frame member B and supports an index head, best shown in Figs. 7 to 13, and also shown in Figs. 1 to 4.

On top of the column 1 is an expanded member 79$^a$ to which is secured, by bolts 80 or otherwise (Figs. 7 and 9), a circular plate 81 having a central hub 82 constituting a bearing for the upper end of the shaft 78, which latter rises above the bearing 82. Mounted on the shaft 78 above the hub or bearing 82 is a disc 83 provided with an index 84 constituting a log index with numbers arranged serially on a spiral line 84$^a$ where intersecting other radial lines 84$^b$. The scale or index is so arranged as to designate units, say inches, and in the particular arrangement indicated in Fig. 11, there are 84 consecutive numbers which will be sufficient for a log 84 inches or more in diameter. Moreover, fractional index marks 84$^c$ may be produced on the line 84$^a$ between the radial lines 84$^b$.

The disc 83 has a peripheral rabbet in which is seated a rotatable ring 85 surmounted by another ring 86 having index markings 86$^a$ thereon constituting a board index. The ring 85 has a peripheral series of ratchet teeth 85$^a$.

On that portion of the shaft 78 projecting above the disc 83, which latter is keyed to the shaft 78, is an arm 87 projecting over the disc 83 to and beyond the periphery thereof. The outer end of the arm 87 carries an index pawl lever 88, and also carries a series of pawls 89, each pressed by a spring 90. The pawls are so disposed that but one at a time will seat in a ratchet tooth 85$^a$, while the other pawls will be disposed at different distances from the shoulder of the tooth. By this means, the movement of the arm 87, in order to seat against a ratchet tooth, will be but a fractional part of the length of the tooth. In actual practice, five pawls 89 are used on the arm 87, which, because of its action to be described, may be termed a release arm. This permits a minimum variation of one-fortieth of an inch where the ratchet teeth are one-eighth of an inch long peripherally of the master index 84. The index ring 86, constituting the board index, is stationary, and in practice is graduated in sixteenths of an inch for ten inches. The ring 86 is held fast with relation to the disc 81 by means of a bracket 91 on the disc 81 and a bracket 92 on the ring 86, the bracket 92 having slots 93 so that the ring may be secured by bolts or other devices passing through the slots 93 and into the bracket 91, the slots 93 permitting a limited peripheral adjustment of the ring 86.

The arm 87 has a hub 94 with a reduced portion 95 on which is mounted another arm 96 constituting a gage stop or repeater. The arm 96 is provided with a spring controlled pawl lever 97 and with a handle 98 overlying the lever 97. A pawl 99 is under the control of the lever 97 and is carried by the arm 96 so as to engage teeth 100 in the outer edge of the ring 86. The arm or gage stop 96 is provided with a pointer 99ª in operative relation to the markings on the ring 86.

The disc 81 is provided with a radial guideway or channel 101 for a scroll rack 102 with teeth 102ª and rising to a sufficient height and there provided with an elongated 103 having at one end a notch 104 with right angle walls to constitute a master-index pointer, the angular notch conforming generally to the angular relation of the spiral line 84ª and the radial lines 84ᵇ. The scroll rack 102 is actuated by a scroll groove 105 in the lower face of the log index member 83, so that when the log index turns with the shaft 78, the index pointer 104 is moved radially over the log or master-index to a commensurate extent.

The index arm 87 has a drop portion 106 in which the pawls 89 are lodged, and this drop portion 106 carries an adjustable release or nose block 107 held by a screw 108 in adjusted positions, the block being adjusted by another screw 109 into the desired position (see Fig. 3). A pointer 110 is provided on the arm 87 in operative relation to the index or scale on ring 86.

Projecting from the column 1 of the casting C is a stud 111 on which is mounted a rock member 112 having arms 113 and 114 in angular relation one to the other, and also provided with a stop arm 115 carrying an adjustable stop screw 116 arranged to engage a fixed part of the frame. The arm 114 is connected by a link 117 to another rock arm 118 mounted on a sleeve 119 movable about a rod 120 carried by a bracket 121, which may constitute a fixed part of the frame member B (see Figs. 5, 23 and 25). The sleeve 119 also carries a rock arm 122 movable into and out of the path of another rock arm 123 fast on a shaft 124 to which the set lever and parts connected to it are also made fast. The rock arm 122 serves as a latch member for the rock arm 123 and the engaging portions of these two members are provided with hardened steel plates or blocks 125 and 126 respectively.

The socket end of the control lever 34 is formed with an ear 127 on one side and mounted in this ear is a bolt or pivot 128 constituting a support for a latch pawl 129 having two arms 130 and 131 at an angle one to the other. The socket 36 is provided with a lug 129ª shown in dotted lines in Figures 22 and 23 in position to engage the master lever 46 on the side opposite to that engaged by the pawl 129. In the path of the arm 130 is a stud 132 carried by a suitable part of the frame member B, while in the arm 131 there is formed a recess 133 of suitable shape to receive the upper end of the master lever 46, the recess 133 terminating at one side in a shoulder 134 which, under certain conditions, bears against the master lever. The pawl 129 constitutes a latch member for the lever 34 (constituting, on its movement in one direction, a recede lever) coupling it to the master lever under certain circumstances, and releasing it from the master lever when the manipulating lever has been moved to cause the arm 130 to engage the stud 132, as seen in Fig. 23. The pawl 129 is thereby rocked on its pivot to lift the shoulder 134 away from the upper end of the master lever, whereupon the manipulating lever may be returned to its first position without carrying the master lever with it.

In considering the operation of the machine, it may be assumed that the saw carriage knees are in a position to engage a log or other piece of lumber on the saw carriage to feed the lumber laterally of the direction of travel of the saw carriage, moving the piece of lumber toward the saw. The index pointer 104 is adjusted to a zero position, and the gage stop or repeater 96 is so adjusted with relation to the travel of the release arm 87 that such travel is restricted to represent the thickness of material to be cut from the log. Furthermore, the release arm 87 is moved over the master index until it engages the gage stop, whereupon it is caused to lock to the ratchet ring 85.

At the start, the operating lever 34 is assumed to be in an upright position, with the brake shoes 14 gripping the gear wheel 6, thus holding the latter against movement, while the clutches 57 are in the inoperative or neutral position. Hence, even with the cable 71 moving and so actuating the sheave 63 and the shaft 55 to which it is keyed, because the clutch members 57 are out of engagement with the clutch member 58, nothing is actuated by the rotating shaft 55.

Now the operator, by grasping the handle 35, rocks the operating lever 34 and this lever engaging the master lever 46 causes the latter to rock in the same direction. The rocking of the operating lever compresses one and releases the other of springs 44. The movement of the master lever 46 causes the hub 45 to rock and with it the shaft 124, crank arms 47 and rock arm 123. The rock arm 123 is in elevated relation to the latching rock arm 122 when the operating lever 34 is in neutral position. When the operating arm is rocked toward the right as shown in Fig. 23, the wear plate 126 on the arm 123 is lowered sufficiently to permit it to catch under the wear plate 125 on the arm 122, whereby, the arm 123 and with it the master lever becomes locked or lodged by the arm 122, the latter being connected to the link 117 which in turn is connected to the arm 113 in the path of the nose 107 of the release arm 87.

The rocking of the shaft 124 by the manipulating lever acts through one of the arms 47 upon the lever 29 to rock the latter about its pivot 30 in opposition to the spring 25. This, in turn, by way of the link 28, causes the rocking of the arm 22, which latter, being fast to the shaft 16, moves said shaft to a position releasing the brake shoes 14 to the action of the spring 15, whereby the gear wheel 6 is released. Simultaneously with these actions, the movement of the master lever is transmitted through the rod 48 to the arm 49 of the rock shaft 50, whereby, one of the clutch members 57 is moved into engagement with the corresponding clutch member 58, this being the one actuating that pinion 61 causing the rotation of the gear wheel 6 in a direction to effect a movement of the carriage knees to feed a log for a cut. While the carriage knees are being propelled, the worm 76 on the shaft 4 carrying the gear wheel 6 causes a rotation of the shaft 78 in a direction to carry the release arm 87 away from the gage stop or arm 96, and toward the release rock arm 113. When the nose 107 engages the arm 113, the link or rod 117 is moved to rock the arm 118 in a direction to carry the arm 122 away from the arm 123, thus unlatching the latter. Before this occurs, the release latch 129 has had its arm 130 engaged by the stop pin 132 so that the latch 129, which is a gravity latch, becomes of the overbalancing action of the arm 131, is lifted out of engagement with the master lever 46, whereupon the operating lever 34 may be released and returned by the springs to its neutral position.

The movement of the release arm is relatively slow so that there is ample time for the various other movements to take place before the master lever is released to return to its normal position. This return movement of the master lever is accomplished by the spring 25 acting through the arm 29, and the spring 25 by returning the arm 29 also returns the brake shoes into gripping relation to the gear wheel 6. The master lever 46 also causes the unclutching of the shaft 55 from the actuated one of the pinions 61, so that the set works is disconnected from the driving cable at the same time that the brake is applied and the parts are brought to a standstill. When the next cut is to be made, the release arm 87 is disconnected from the ring 85 which propels it and is returned toward its first position until arrested by the gage stop or repeater 96 when the parts are in position for the repetition of the setting over of the log. These operations may be repeated as often as necessary, requiring only the return of the release arm and the actuation of the operating lever 34.

The index pointer 104 travels progressively in a radial direction over the master index 83, the latter rotating progressively under the repeated setting over of the log or timber. By having the master index provided with spirally arranged markings, an index plate of relatively small diameter answers for logs or timbers of larger diameter irrespective of the number of the settings or the extent of such settings of the log.

The arrangement of the master index also permits accurate setting over of the logs within small fractions of an inch, while the provision of the multiple dogs 89 on the release arm further contributes to very accurate adjustments with far greater accuracy than has heretofore resulted.

When it is desired to retract or recede the carriage knees, the operating lever 34 is moved in a direction opposite to that first described, that is, it is moved to the left as viewed in Figs. 1, 22 and 23, but is there held by the operator. This results in the unclutching of the brake shoes from the gear wheel 6 and the shifting of the other clutch member 57 into clutching engagement with the corresponding clutch member 58, whereupon the shaft 4 is rotated in the opposite direction and the saw carriage knees are withdrawn or receded as far as desired, the operation being stopped at the volition of the operator by returning the operating lever 34 to the neutral position. This operation also serves to retract or receding the pointer 104 to an extent corresponding to the recessive movement of the saw carriage knees. In this last operation, that is, the recede operation, the ratchet ring 85 either rides idly under the pawls 89 of the release lever or the latter is carried around into engagement with the gage stop 96 to be there arrested from further movement.

The thickness to be cut is determined by the graduations on the ring 86 with relation to which the gage stop 96 is adjustable. The master index is a totalizing index, by means of which the total amount cut from the log is indicated at once without the necessity of adding up the various amounts cut or set.

It is quite common in various machines to use an electric drive, wherefore, the rope and sheave drive may be replaced by an electric motor mounted on the base A and keyed to the shaft 55. Since the set works moves with the saw carriage, either trolley or loop cable conductors may be employed for the motor.

What is claimed is:—

1. In power set works for saw mill carriages, a shaft for effecting movement of the saw carriage knees, another shaft driven at a low speed by the first shaft, a disk secured to the second shaft, an index provided on the face of said disk, a ring having a scale thereon and mounted upon the disk, a bracket secured upon a fixed support, another bracket secured to the ring and having a slot, and a securing element passing through the two brackets and received within the slot for permitting limited adjustment of the ring relative to the disk.

2. In power set works for saw mill carriages, a shaft for effecting movement of the saw carriage knees, another shaft driven at a low speed by the first shaft, a disk secured to the second shaft, an index provided on the face of said disk, a peripheral rabbet provided on the disk, a ring having ratchet teeth mounted in the rabbet, means connecting the ring to the disk, a second ring having a scale thereon and mounted upon the first ring, an arm pivoted on the second shaft and carrying pawls for engagement with the ratchet teeth, a bracket secured upon a fixed support, another bracket secured to the second ring and having a slot, and a securing element passing through the ring bracket and received within the slot for permitting limited adjustment of the ring relative to the disk.

3. In power set works for saw mill carriages, a shaft for driving the index mechanism, a disk secured upon the shaft to rotate therewith, a circular plate mounted on the shaft but stationary and supporting the disk, a ring member seated on the periphery of the disk and having ratchet teeth, a second ring member seated on the first ring and having ratchet teeth also, the second ring and the disk both having complemental scales, means connecting the second ring to the stationary plate, a release arm pivotally mounted on the shaft and swingable over the face of the disk having the scale, pawl mechanism carried by the release arm and engaging with the teeth of the first ring, a repeater arm swingably mounted on the pivotal portion of the release arm but between the latter and the disk, and pawl mechanism carried by the repeater arm for engagement with the ratchet teeth of the second ring.

4. In power set works for saw mill carriages, a shaft for turning the index mechanism, a disk secured upon the shaft, a ring having ratchet teeth mounted on the disk, an index ring surrounding the disk and supported stationary, means for effecting adjustment of the index ring relative to its support, a release arm pivotally mounted on the shaft, a pawl on the release arm for engaging the ratchet teeth to hold the release arm relative to the disk, a drop portion provided on the release arm, a nose block carried by the drop portion, means for holding or releasing the nose block upon the drop portion, and means for fine adjustment of the position of the nose block when released.

5. In power set works for saw mill carriages, a shaft for turning the index mechanism, a disk secured upon the shaft, an index on one face of the disk, a scroll groove on the other face thereof, a radially extending member fixed to a support and providing a guideway or channel, a scroll rack slidable in said channel and meshing with the scroll groove, and a bar constituting a pointer secured to the scroll rack and extending over the index face of the disk in a radial direction.

6. In power set works for saw mill carriages, a shaft for turning the index mechanism, a disk secured upon the shaft, a ring mounted on the disk to rotate therewith and having ratchet teeth on its periphery, a second ring mounted on the disk and likewise provided with ratchet teeth, said second ring being stationary and bearing a scale or index, a release arm swingingly mounted on the shaft and adapted to be locked to the first ring, a gage stop or repeater arm swingingly mounted on the pivotal portion of the first arm and adapted to be held to the second ring, an index on one face of the disk, a scroll groove on the other face thereof, a radially extending member fixed to a support and providing a guideway or channel, a scroll rack slidable in said channel and meshing with the scroll groove, and a bar constituting a pointer secured to the scroll rack and extending over the index face of the disk, in a radial direction.

7. In power set works for saw mill carriages, drive and driven means for the knees of the saw mill carriage, set mechanism for determining the extent of movement of the knees, and controlling means for the driven parts of the set works comprising a manipulating rock lever, means for centralizing the rock lever, the rock lever being movable from the central position in either direction, a master lever on which the manipulating lever is pivotally mounted, brake mechanism for the driven parts, means constraining the brake mechanism to active position, rock arms on the master lever for moving the brake mechanism in opposition to its normal constraint, latch means between the manipulating and master levers for coupling them for common movement and permitting releasing of the manipulating lever from the master lever, a latch arm on the master lever, a latch member in the path of the latch arm, and connections between the set mechanism and the second-named latch member for releasing the latch arm and master lever carrying it on the completion of active travel of the set devices.

8. In power set works for saw mill carriages, drive and driven means for the knees of the saw mill carriage, set mechanism for determining the extent of movement of the knees, and controlling means for the driven parts of the set works comprising a manipulating rock lever, means for centralizing the rock lever and from which position it may be moved in either direction, a master lever, brake mechanism for the driven parts, means constraining the brake mechanism to active position, rock arms on the master lever for moving the brake mechanism in opposition to its normal constraint, latch means between the manipulating and master levers for coupling them for common movement and for releasing the manipulating lever from the master lever, a latch arm on the master lever, a latch member in the path of the latch arm, connections between the set devices and the second-named latch member for releasing the latch arm and master lever carrying it on the completion of active travel of the set devices, the means for coupling the manipulating and set levers comprising a rockable pawl provided with a shoulder for engaging the master lever, and stop means for the pawl on a fixed part of the set works to cause the pawl to release the manipulating lever from the master lever.

9. In power set works for saw mill carriages, means for adjusting the carriage knees, and means for controlling the extent of adjustment including a suitable support, a rotatable master index mounted thereon, a pointer for the master index movable thereby, an index ring on and surrounding the master index and provided with ratchet teeth, a gage arm movable over the index and having means for connecting it to the ratchet teeth, another ratchet ring surrounding the master index, a release arm movable over the master index and provided with means for connecting it to the second ratchet ring, said release arm having an extent of movement in one direction determined by the gage stop, and connections in the path of the release arm when moved by the ratchet ring for stopping the set works.

10. In power set works for saw mill carriages having means for adjusting the saw carriages knees, setting mechanism for determining the extent of set of the knees, comprising a suitable support, a rotatable disc-like master-index member, superposed ratchet rings surrounding the master-index member, one of the ratchet rings being fast to the master member, and the other ring being provided with index markings and being secured to a fixed part of the structure to hold it against rotation with the master member, a shaft secured to the master member for rotating the latter, release and gage stop arms on the shaft and each movable independently of the shaft about the axis of rotation of the latter, pawl means on the gage arm in position to secure it to the ratchet ring having index markings thereon, pawl means on the release arm for connecting it to the rotatable ratchet ring, an index member associated with the master index and driven thereby for totalizing the movements of the release arm, and means under the control of the release arm for stopping the feed of the carriage knees when the release arm reaches the limit of its travel in one direction.

11. In power set works for saw mill carriages having means for adjusting the saw carriage knees, setting mechanism for determing the extent of set of the knees, comprising a suitable support, a rotatable disc-like master-index member, superposed ratchet rings surrounding the master-index member, one of the ratchet rings being fast to the master member, and the other ring being provided with index markings and secured to a fixed part of the structure to hold it against rotation with the master member, a shaft secured to the master member for rotating the latter, release and gage stop arms on the shaft and each movable independently of the shaft about the axis of rotation of the latter, pawl means on the gage arm in position to secure it to the ratchet ring having index markings thereon, pawl means on the release arm for connecting it to the rotatable ratchet ring, an index member associated with the master index and driven thereby for totalizing the movements of the release arm, and means under the control of the release arm for stopping the feed of the carriage knees when the release arm reaches the limit of its travel in one direction, said release arm being provided with a series of associated pawls each having a different relation to the ratchet teeth on the rotatable member from the others, whereby the positioning of the release arm with relation to the ratchet teeth of the rotatable ring may represent but a fractional portion of the length of a ratchet tooth thereof.

12. In power set works for saw mill carriages having mechanism for adjusting the carriage knees, an index device comprising supporting means, a shaft journaled therein, a disc-like member on and rotatable with the shaft and having an exposed face provided with index markings, a pointer movable over the index face of the index member, and said pointer, and index member having coacting parts on the face of the index member remote from that containing the markings, whereby rotative movements of the index member cause radial movements of the pointer, ratchet rings mounted in superposed order on a peripheral portion of the rotatable index member, the lower one of the rings being secured to the rotatable index member for movement therewith and the higher ring being secured to a fixed part of the set works and having its exposed surface provided with index markings, a release arm mounted on and movable about the shaft and provided with pawl means for engaging the lower ratchet ring for actuation thereby, means in the path of the release arm for stopping the set works at the movement of the arm in one direction, and another arm above the index member and constituting a gage stop, said second arm having pawl means for engaging the higher one of the ratchet rings to limit the movement of the release arm in a direction the reverse of that first named.

13. In power set works for saw mill carriages, a power transmitting shaft having a gear wheel thereon, brake shoes housed by the gear wheel, means imparting to the brake shoes a normal tendency to move out of engagement with the gear wheel, means mounted on the shaft for pivotally supporting the brake shoes, means for separating the brake shoes into braking relation to the gear wheel, said last-named means including a rock arm and a spring, another rock arm for moving the first rock arm in opposition to the spring and in a direction to disconnect the brake members from the gear wheel, a manipulating set lever having a normal tendency toward a neutral position, and means under the control of the set lever for engaging the second-named rock arm to move the brake-actuating means to a position to release the gear wheel.

In testimony that I claim the foregoing as my own, I have hereto affixed my signature in the presence of two witnesses.

GEORGE WASHINGTON DORMAN.

Witnesses:
J. M. A. GIBSON,
PAUL F. LUETH.